United States Patent [19]

Chirino et al.

[11] 4,221,604

[45] Sep. 9, 1980

[54] HERMETIC SEALS

[75] Inventors: Agustin M. Chirino, Elmira; Gerald H. Yost, Corning, both of N.Y.

[73] Assignee: Corning Glass Works, Corning, N.Y.

[21] Appl. No.: 908,003

[22] Filed: May 22, 1978

[51] Int. Cl.³ .......................... C08K 3/10; C08K 3/40
[52] U.S. Cl. ................................. 106/286.5; 106/39.6
[58] Field of Search .................. 106/286, 39.6, 286.5; 75/234, 206; 252/512

[56] References Cited

U.S. PATENT DOCUMENTS

| | | | |
|---|---|---|---|
| 3,045,332 | 7/1962 | Denison, Jr. | 75/234 |
| 3,123,470 | 3/1964 | Denison, Jr. | 75/201 |
| 3,295,934 | 1/1967 | Bre | 75/234 |
| 3,523,357 | 8/1970 | Meyer | 75/206 |
| 3,951,669 | 4/1976 | Malmendier | 106/39.6 |
| 4,148,761 | 4/1979 | Kazmierowicz | 252/512 |

OTHER PUBLICATIONS

Chem. Abst. 71:84,256g, 1969.

*Primary Examiner*—Theodore Morris
*Attorney, Agent, or Firm*—Richard N. Wardell

[57] ABSTRACT

The forming of hermetic seals suitable for sealing materials having dissimilar thermal expansions which are formed by reacting an effective amount of a metal powder, selected from the group consisting of aluminum, antimony and zirconium, with glass frit having a softening point of $<750°$ C. and a coefficient of thermal expansion sufficiently compatible with the materials being sealed to yield seals characterized by a coefficient of thermal expansion closely matching or similar to those of the materials being sealed and a use temperature equal to or greater than 1000° C. The seals of this invention are particularly suitable for bonding ceramic to ceramic.

8 Claims, No Drawings

HERMETIC SEALS

BACKGROUND OF THE INVENTION

In the prior art there is disclosed sealing glasses having high coefficients of thermal expansion and generally low softening points of about 500° C., such as the lead borosilicate sealing glasses described in U.S. Pat. No. 2,642,633. Also disclosed in the prior art is the method of incorporating ceramics or metal additives into sealing glasses for the purpose of adjusting the high coefficient of thermal expansion of the glasses to a point intermediate that of the materials being sealed. U.S. Pat. No. 3,123,470 discloses incorporating metal particles (molybdenum, copper and iron) into a vitreous bonding material in order to modify the thermal expansion of the seal formed to that of the materials being bonded. U.S. Pat. Nos. 3,258,350 and 3,951,669 likewise disclose incorporating additives (ceramics and glass-ceramics) to sealing glasses for similar reasons.

Seals formed in this manner were generally admixtures of the additive incorporated within a predominantly glassy matrix. A major difficulty with such seals, therefore, was that they were inadequate for use above the softening point of the glass used to form the seal since the glassy seal formed would deform and flow above that temperature. It was thought that firing the seals formed of such admixtures to a temperature sufficient to cause a possible reaction between the frit and the additive would limit the effectiveness of the additive as an expansion modifier.

The invention disclosed herein was designed to solve the specific problem of providing mechanically strong, hermetic seals for bonding an alumina tube to a zirconia tube, used as a solid electrolyte, in oxygen sensor units. Sealants were required which had not only a coefficient of thermal expansion which would match those of the materials being sealed, but which would also remain stable, mechanically strong and impervious to temperatures of 1000° C. and above 1000° C.

The strong bonding of materials, such as ceramics, which experience severe thermally induced expansion-contraction stresses have been difficult to achieve. Generally, in high temperature applications, mechanically strong seals are required to accommodate the dissimilar or substantially different thermal expansions of the bonded materials and thereby diffuse such expansion-contraction stresses.

Cermets are known in the art as metallic-ceramic materials comprising separately metallic and ceramic phases which are very refractory and hard. U.S. Pat. No. 2,702,750, discloses the forming of cermet materials composed of alumina and aluminum silicon alloy, by reacting aluminum metal with $SiO_2$ at temperatures of 700° C. to 900° C. the formation of other cermets composed of alumina and aluminum metal alloy is disclosed in U.S. Pat. No. 3,034,908 where a reacting temperature between 900°-950° C. was required. Neither of these patents, however, discloses or suggests reaction temperatures equal to or greater than 1000° C., for the forming of mechanically strong, impervious seals.

SUMMARY OF THE INVENTION

We have discovered hermetic seals which, depending on the specific sealant chosen, can be suitable for use to 1000° C. or above 1000° C. In forming the seals of this invention, a metal chosen from the group consisting of aluminum, antimony or zirconium is reacted with glass frit having a softening point of <750° C. and a thermal expansion sufficiently compatible with the materials being bonded to yield a seal having a coefficient of thermal expansion closely matching or similar to those of the materials being sealed and a use temperature of either 1000° C., or >1000° C. depending on the metal selected. Aluminum metal powder, when selected, will form seals having a use temperature of >1000° C., while antimony or zirconium metal powders will form seals having use temperatures to 1000° C.

When antimony metal is selected, a more desirable seal, having use temperatures of up to 1000° C., is formed.

Suitable seals of this invention are formed when from 2-40 wt.% aluminum, from 2-23 wt.% antimony or from 2-17 wt.% zirconium metal powders (based on metal powder plus glass frit) are reacted with the glass frit. The glass frit should have a softening point of <750° C. and a coefficient of thermal expansion which is sufficiently compatible with the materials being sealed such that, when reacted with an effective amount of the selected metal powder, the seal formed will be characterized by a coefficient of thermal expansion similar to those of the materials being sealed and a use temperature to 1000° C., or >1000° C. In forming the seal, the metal powder selected is mixed with glass frit in the correct proportions, and with sufficient vehicle of either organic or inorganic (e.g. water or turpentine) composition added thereto to form a sealing mixture of sufficiently thick coating consistency to coat the sealing surfaces and effect the seal. Any known method of applying the sealing mixture can be utilized, such as with a brush or spatula. The materials which have been sealed can then be fired at a temperature sufficiently high to complete the reaction and form the impervious crystalline seal having the correct coefficient of thermal expansion. A firing temperature of 1000° C. is suggested for seals formed when antimony or zirconium powders are selected, and of 1300° C. when aluminum powder is selected. It is preferable, however, to fire the seals of this invention to the maximum use temperature envisaged.

When aluminum metal is selected to form the seal, the powder should have a particle size of not greater than 60 microns, with a more desirable range being from 1-40 microns. The relative amounts of the metal powder to glass frit, and the thermal expansion of the glass frit used to form the seal are important variables for adjusting the use temperatures and the thermal expansion of the seal formed. It is desirable for the antimony powder to have a particle size of about 200 microns and zirconium powder to be <100 microns in size.

While any glass having the physical characteristics noted above may be utilized, glasses having a composition consisting essentially in weight percent, of 72-75% $SiO_2$, 15-19% $Na_2O+K_2O$, 7-9% $CaO+MgO$ and 1-2% $Al_2O_3$ are particularly suitable for practicing this invention.

Seals produced in accordance with this invention form mechanically strong, hermetic bonds suitable for ceramic-ceramic bonding.

DETAILED DESCRIPTION OF THE INVENTION

This invention comprises reacting a metal powder selected from the group consisting of aluminum, antimony and zirconium with glass frit to form an impervious, dimensionally stable and mechanically strong seal having the ability to withstand the expansion-contraction stresses inherent in bonding materials having substantially differing or dissimilar thermal expansions. It is understood by those skilled in the art that mechanically strong seals are formed when the coefficients of thermal expansion of the materials being sealed are closely matched or similar to the coefficients of thermal expansion of the seals formed therebetween. In practicing this invention, the seals formed were found to be not only mechanically strong, but also hermetic.

In forming the seal, glass frit having a low softening point <750° C. and a thermal expansion sufficiently similar to the materials being sealed is combined with proportional amounts of the metal powder selected to yield a seal having an expansion matching that of the sealed materials. Suitable glasses, which are reduced to the finely divided frit, for practicing this invention are typically soda lime, soda zinc, lead and lead borosilicate glasses. The invention is not limited, however, to the glasses mentioned above as any known sealing glasses may be used which have a softening point <750° C. and a thermal expansion compatible with the materials to be joined. A particularly suitable glass for practicing this invention has a compositional range consisting essentially, in weight percent on the oxide basis, of 72–75% $SiO_2$, 15–19% $Na_2O + K_2O$, 7–9% $CaO + MgO$ and 1–2% $Al_2O_3$. One skilled in the art will appreciate that the selection of the glass for making the seal will depend on various factors, the most important of which are: the thermal expansion characteristics of the materials being sealed over the use temperature range; the thermal expansion of the glass at its setting point (arbitrarily defind herein at 5° C. above the strain point which corresponds to a viscosity of approximately $10^{14.5}$ poises when measured by the Tentative Method of Test for Annealing Point and Strain Point of glass), and the softening point of the glass.

The matching of thermal expansions over a given temperature range with the materials being sealed is the primary criterion in the selection of the sealing glass. For this reason the glass selected should have a sufficiently matching or compatible coefficient of thermal expansion such that, when reacted with an effective amount of the metal powder, the expansion of the formed seal will match (e.g. be intermediate) those of the materials being bonded.

Although the amount of metal powder utilized to form the seal will vary with respect to the materials being bonded, the amount of metal powder to glass frit should be within the overall limits of from 2–40 wt.% for aluminum, from 2–23 wt.% for antimony and from 2–17 wt.% for zirconium. Seals formed having a concentration of the selected metal powder in excess of the limit stated was found to be cracked at the interface with the bonded materials. Likewise, seals containing concentrations of the selected metal powder below the minimum stated, resulted in seals with a predominantly glass phase and with a use temperature similar to the softening point of the glass frit.

The physical properties of the seal, therefore, such as thermal expansion and use temperature, are largely dependent on expansion of the frit used as well as the relative amounts of metal powders to glass frit utilized. Increasing the amounts of metal powder in the sealing mixture will yield a more crystalline seal with higher use temperatures while decreasing amounts of the metal resulted in a more glassy seal with lower use temperature. Some remaining glassy phase is generally beneficial since it imparts dimensional stability to the seal and assists in the consolidation of the seal formed. As the optimum sealing composition is determined by the thermal expansion of the materials being bonded and the use temperature envisaged, it should be obvious that the overall limits of metal powder to glass stated above would not be applicable to all materials being bonded.

The seals produced by reacting aluminum with glass frit, for instance, were developed primarily for hermeticallysealing dense, high purity >98% alumina extension tubes to stabilized zirconia tubes for use in high temperature (1000° C.–1600° C.) oxygen sensor units. For such applications, where the coefficient of thermal expansion of the sealed tubes ranged from 80–110×10$^{-7}$/° C. (25°–1500° C.), the amount of aluminum powder should not be greater than 30 wt.% of the frit plus metal powder. Similarly when antimony metal or zirconium metal are selected to form the seals for sealing the alumina tube to the zirconia tube, the amount of antimony powder should not exceed 17 wt.% and zirconium powder should not exceed 13 wt.%. At greater than 30 wt.% aluminum powder, the seal formed was found to crack at the alumina-seal interface. Where, however, alumina was being sealed to alumina, the amount of aluminum powder can range from 25–40 wt.%. Successful practice of the invention would require not only choosing a glass having a substantially compatible thermal expansion but also determining what proportion of metal powder, within the overall limit stated above, to glass frit would form a suitable seal having the correct expansion characteristics for the specific materials being sealed.

The forming of the seal comprises mixing, by hand or any other means known in the art, a metal selected from the group consisting of aluminum, antimony or zirconium, and glass frit with an appropriate amount of vehicle to impart a sufficiently thick consistency to the resulting sealing mixture. The organic or inorganic vehicle chosen should be capable of complete volatilization or burnout well below the sealing temperature.

The consistency of the mixture should be such that it does not flow away from the sealing surface after application. The amount of added vehicle will depend to a large extent on the coverage and thickness of the desired coating on the sealing surface. A wide variety of vehicles can be employed since both organic and inorganic compositions such as water, turpentine, Tween 80 (polysorbate) and alcohol (methanol) were found suitable. Glasses having especially low viscosities at temperature of ~700° C. (i.e. high lead glasses) tend to flow away from the sealing surface during firing. Small amounts of alumina of <325 (Tyler) mesh when added to the sealing mixture containing such glasses, were found to increase the viscosity of the sealing mixture at the sealing temperature of the glass.

In practicing this invention the particle size of the powder used can be important to the forming of suitable seals. It was found that the aluminum metal, for instance, should have a particle size of not greater than 60 microns and should preferably be within the range from 1–40 microns. The antimony particle size should be about 200 microns in size while the zirconium particle size should be <100 microns, with a preferable range being from 25–45 microns. While the particle size of the frit used is not critical, it is recognized in the art that coarser particles have the effect of increasing the porosity of the body formed therefrom. It is therefore preferable for the frit not to exceed a 325 (Tyler) mesh size.

After joining the materials with the sealing mixture, the assembly is fired to a temperature at which the reaction is completed. Firing to a temperature of at least 1300° C., for seals formed with aluminum powder, however, insures a more void free impervious seal which is also mechanically stronger and more stable than one fired to 1100° C. Preferably firing should be to the maximum use temperature expected. No special firing rate or firing schedule was found necessary to form the hermetic seal, and a 1 hour hold was found to be adequate for full consolidation of the seal.

As previously indicated above, seals formed by reacting antimony or zirconium metal with glass frit in the manner described herein have maximum use temperatures of 1000° C. and are capable of forming mechanically strong, hermetic seals for sealing ceramic, metal or glass materials. Seals formed by reacting aluminum metal with glass frit in the manner disclosed herein have use temperatures of >1500° C. and are particularly suitable for sealing high expansion ceramic materials.

EXAMPLES OF PREFERRED EMBODIMENTS

The present seals, as indicated above, were developed for use in oxygen sensor units where it was necessary to seal an impervious alumina extension tube to a yttria-stabilized, zirconia solid electrolyte tube. The sensor units, so designed, were to be used either exclusively in high temperature applications (above 1000° C.) or exclusively in low temperature applications (below 1000° C.). The coefficient of thermal expansion of the sealed tubes can range from $80-110 \times 10^{-7}/°C.$ (25° C.–1600° C.), depending on the use temperature range involved. In some in situ applications, the installed oxygen sensor units are fixed in a vertical position over an extended period of time. Mechanically strong, hermetic seals which can withstand the contraction-expansion stresses as well as the constant gravitational pull are necessaary, therefore, for the continued accurate functioning of the sensor. The seals of this invention can be considered suitable for sealing materials having substantially differing or dissimilar coefficients of thermal expansions that require hermetic seals at high use temperature of 1000° C. or greater than 1000° C.

EXAMPLE I

An alumina extension tube 12" long, having both ends open, and an I.D. of about 0.375" was sealed to the open end of a 2¼" long zirconia, solid electrolyte tube having a O.D. of about 0.350". The tubes were joined by the seal of this invention, formed by mixing by hand 6 grams of aluminum powder (1–40μ) with 20 grams glass frit (−325 mesh). The frit, Corning Glass Works Code 0080 glass, has a composition by weight on the oxide basis of 73.6% $SiO_2$, 16.6% $Na_2O$, 4.8% CaO, 3.3% MgO, 1.4% $Al_2O_3$ and 0.33% $K_2O$. Turpentine was added to give a mixture of thick consistency. The sealing mixture was then applied to the outer top surface of the open end of the zirconia tube which was then inserted into one end of the alumina extension tube. The tubes, joined in this manner, were placed on zirconia blocks and fired in air to 1430° C. for 1 hour. The seal formed was found to be air tight when tested by submerging the sealed portion of the joined tubes in water and applying air, under pressure, through the open end of the alumina tube. No evidence of escaping air was observed. Tubes sealed in this manner have functioned without leaks in oxygen sensor units in high temperature environments.

EXAMPLE II

Alumina and zirconia tubes described in Example I were sealed utilizing the same glass composition as given in Example I, except that, the relative proportions of metal powder to glass frit were varied and the hold time was 2 hours. The following data was obtained.

| Glass Frit (grams) | Al Powder (1–40μ) grams | Appearance of Seal |
| --- | --- | --- |
| 20 | 4.84 | glassy - poor |
| 20 | 6.84 | crystalline - good |
| 20 | 7.84 | crystalline - good |
| 20 | 8.84 | crystalline - cracked |

EXAMPLE III

Sealing mixtures were prepared by mixing 1 and 2 grams of antimony metal powder having an average particle size of 200 l microns with 20 grams of a glass frit having the same composition as in Example I. Turpentine was used as the vehicle to give the mixture a thick consistency. The two sealing mixtures thus prepared were used to separately seal alumina tubes to zirconia tubes having the same dimensions as given in Example I. The sealed tubes were then fired in air on zirconia blocks to a temperature of 1000° C. for 1 hour.

The seals were found to be air tight when tested in the same manner as described in Example I. Tubes sealed in this manner have functioned to temperatures of 1000° C., without impairment to the seal, in oxygen sensor units.

EXAMPLE IV

Sealing mixtures prepared in a manner disclosed in Example III were used to seal a stainless steel tube to a zirconia tube, and a VYCOR ® brand glass tube to a zirconia tube with similar results. The dimensions of all the sealed tubes were identical to those described in Example I.

EXAMPLE V

A seal mixture using turpentine as the vehicle was formed by mixing 1 gram of zirconium metal with 20 grams of glass frit having a composition in weight percent of 74.2% PbO, 12.9% ZnO, 8.4% $B_2O_3$, 2.2% $SiO_2$, 2.1% BaO and 0.10% $Al_2O_3$. The mixture was used to seal an alumina tube to a zirconia tube, both tubes having the same dimensions as in Example I. The seal formed by firing to a temperature of 1000° C. for 2 hours was found to be impervious and without cracks.

We claim:

1. A sealing mixture for producing a mechanically strong, hermetic seal between materials being sealed together thereby, which consists of glass frit, a metal powder and a vehicle, the glass frit having a softening point of less than 750° C., the metal powder being selected from the group consisting of aluminum, antimony and zirconium, the amount of aluminum powder being limited to from 2–40 wt.%, the amount of antimony powder being limited to from 2–23 wt.% and the amount of zirconium powder being limited to from 2–17 wt.% of the glass frit plus metal powder, the frit having a coefficient of thermal expansion sufficiently compatible with the materials being sealed and the metal powder selected being combined with the frit in an effective amount such that the mixture, when reacted, will yield a seal characterized by a coefficient of thermal expansion closely matching or similar to those of the materials being sealed and by a use temperature of up to 1000° C. when antimony or zirconium metal is chosen or >1000° C. when aluminum metal is chosen.

2. The sealing mixture of claim 1 wherein the selected metal powder is aluminum powder with a particle size of not greater than 60 microns.

3. The sealing mixture of claim 1 wherein the selected metal powder is antimony powder with a particle size of about 200 microns.

4. The sealing mixture of claim 1 wherein the selected metal powder is zirconium powder with a particle size of less than 100 microns.

5. The sealing mixture of claim 1 wherein sufficient vehicle is added to provide a mixture of consistency to effect coating of the materials being sealed.

6. The mixture of claim 1 wherein the frit is of glass selected from soda lime glass, soda zinc glass, lead glass and lead borosilicate glass.

7. The mixture of claim 6 wherein the glass is soda lime glass consisting essentially, in weight percent, of 72-75% $SiO_2$, 15-19% $Na_2O+K_2O$, 7-9% $CaO+MgO$ and 1-2% $Al_2O_3$.

8. The mixture of claim 6 wherein the glass is lead borosilicate glass with a composition, in weight percent, of about 74.2% PbO, 12.9% ZnO, 8.4% $B_2O_3$, 2.2% $SiO_2$, 2.1% BaO and 0.1% $Al_2O_3$.

* * * * *

UNITED STATES PATENT AND TRADEMARK OFFICE
CERTIFICATE OF CORRECTION

PATENT NO. : 4,221,604
DATED : September 9, 1980
INVENTOR(S) : Agustin M. Chirino and Gerald H. Yost It is certified that error appears in the above-identified patent and that said Letters Patent are hereby corrected as shown below:

Column 1, line 55, change "C. the" to -- C. The --.

Column 3, line 33, change "defind" to -- defined --.

Column 4, line 11, change "meticallysealing" to -- metically sealing --.

Column 4, line 54, change "mesh" to -- mesh, --.

Column 6, line 23, change "200 1 microns" to -- 200 microns --.

Signed and Sealed this

Ninth Day of December 1980

[SEAL]

Attest:

SIDNEY A. DIAMOND

Attesting Officer

Commissioner of Patents and Trademarks